Figure 1:
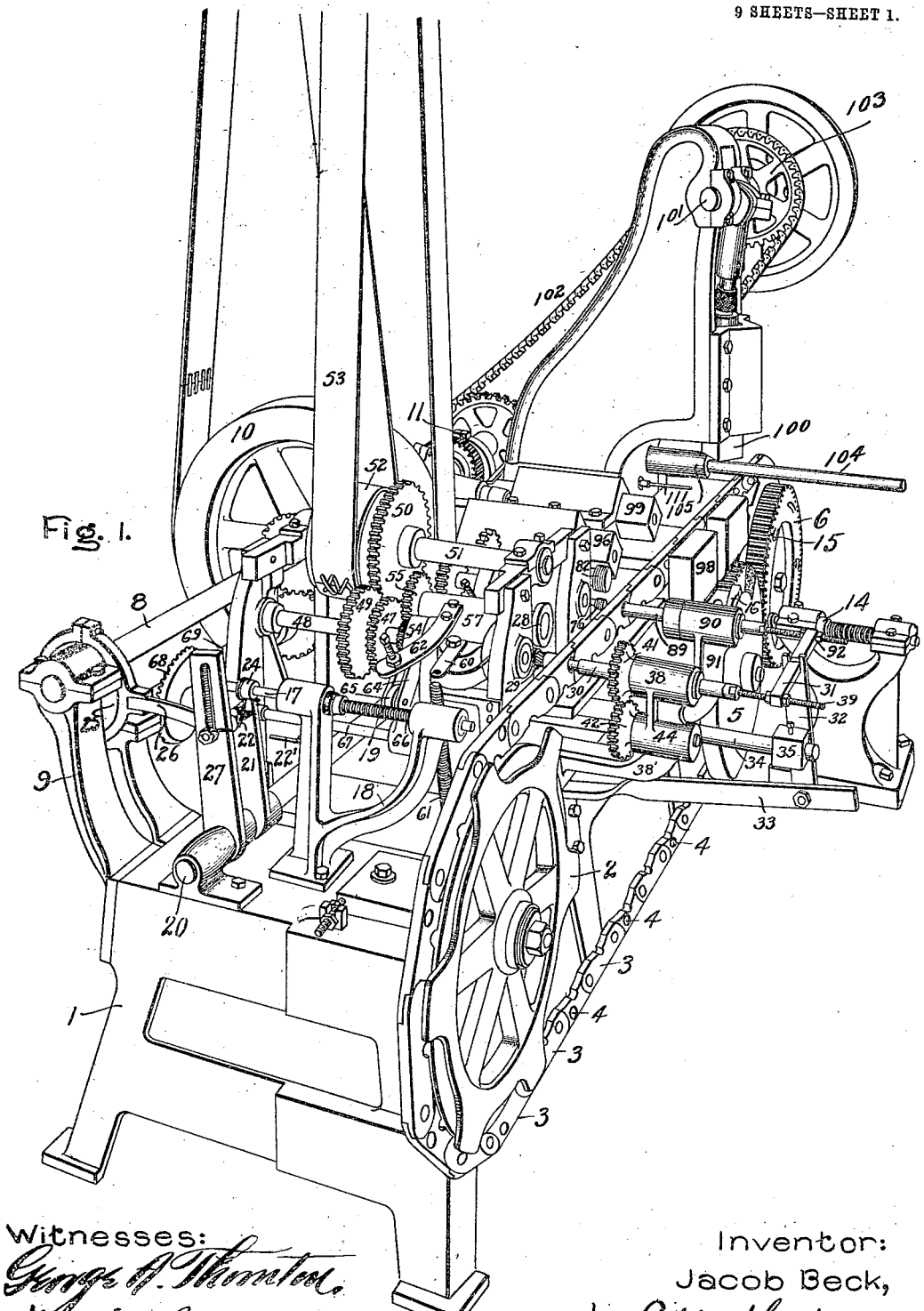

No. 843,789. PATENTED FEB. 12, 1907.
J. BECK.
MACHINE FOR MAKING SHELLS FOR ELECTRIC LAMP SOCKETS.
APPLICATION FILED MAR. 21, 1904.

9 SHEETS—SHEET 5.

Witnesses:
Inventor:
Jacob Beck,
by
Att'y.

No. 843,789. PATENTED FEB. 12, 1907.
J. BECK.
MACHINE FOR MAKING SHELLS FOR ELECTRIC LAMP SOCKETS.
APPLICATION FILED MAR. 21, 1904.
9 SHEETS—SHEET 6.

Witnesses:

Inventor:
Jacob Beck,
by Att'y.

No. 843,789. PATENTED FEB. 12, 1907.
J. BECK.
MACHINE FOR MAKING SHELLS FOR ELECTRIC LAMP SOCKETS.
APPLICATION FILED MAR. 21, 1904.
9 SHEETS—SHEET 7.

Witnesses:

Inventor:
Jacob Beck,
by Albert G. Davis
Atty.

No. 843,789. PATENTED FEB. 12, 1907.
J. BECK.
MACHINE FOR MAKING SHELLS FOR ELECTRIC LAMP SOCKETS.
APPLICATION FILED MAR. 21, 1904.
9 SHEETS—SHEET 8.
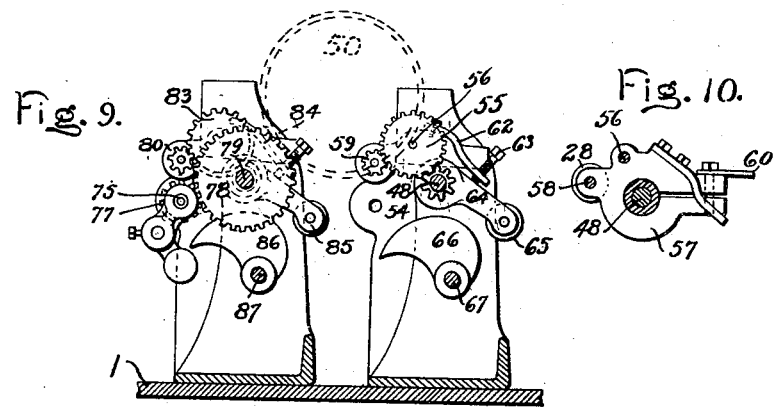
Fig. 12.
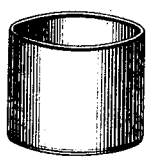
Fig. 13.
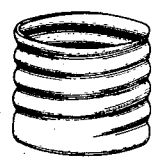
Fig. 14.
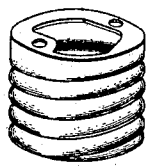
Fig. 15.
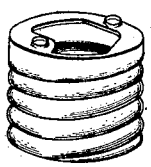
Fig. 16.
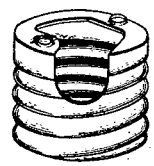
Fig. 17.
Witnesses:
George A. Thornton,
Helen Oxford
Inventor:
Jacob Beck,
by Albert G. Davis
Atty.

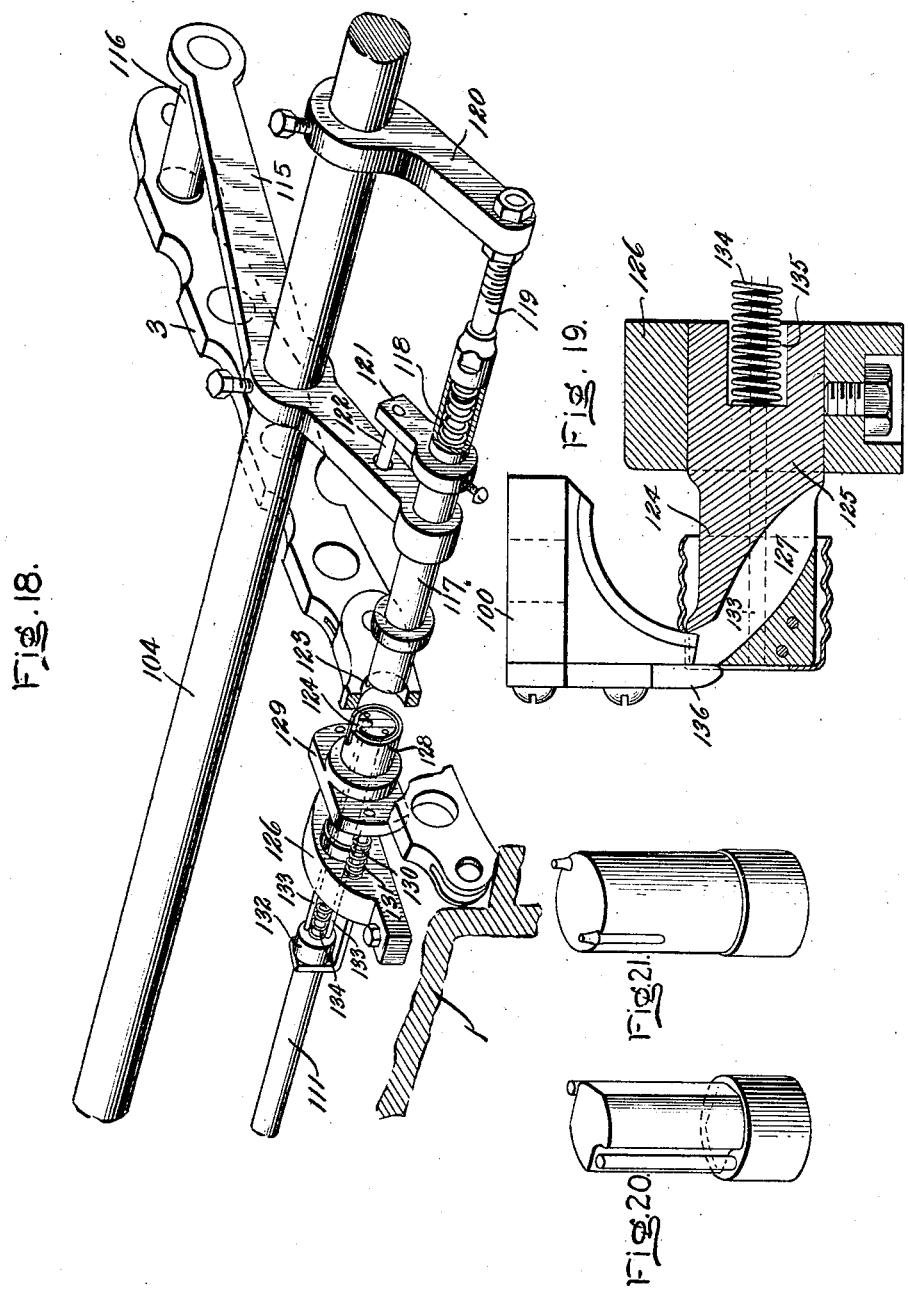

UNITED STATES PATENT OFFICE.

JACOB BECK, OF SCHENECTADY, NEW YORK, ASSIGNOR TO GENERAL ELECTRIC COMPANY, A CORPORATION OF NEW YORK.

MACHINE FOR MAKING SHELLS FOR ELECTRIC-LAMP SOCKETS.

No. 843,789.   Specification of Letters Patent.   Patented Feb. 12, 1907.

Application filed March 21, 1904. Serial No. 199,268.

*To all whom it may concern:*

Be it known that I, JACOB BECK, a citizen of the United States, residing at Schenectady, county of Schenectady, State of New York, have invented certain new and useful Improvements in Machines for Making Shells for Electric-Lamp Sockets, of which the following is a specification.

This invention relates to sheet-metal-working machines; and its object is primarily to provide an automatic machine for making the sheet-metal shells for the sockets of incandescent-electric lamps, though it is capable of operating on cup-shaped blanks of sheet-metal for any purpose.

The machine performs a series of operations upon a cupped blank which is automatically conveyed from one end of the machine to the other and is delivered in a finished condition. The operations consist in trimming the edge of the cup-shaped blank, rolling a screw-thread in its sides, punching one or more holes in its bottom, reaming one or more holes for the fastening-screws, and finally cutting out a segment of one side. Any one or more of these operations may be omitted or modified at pleasure. The trimming and screw-threading mechanisms are preferably driven by a special belt-pulley, while the other mechanisms are driven from a common power-shaft. The blanks are conveyed from one forming mechanism to another by a carrier, preferably an endless one, such as a chain or belt, and said carrier is provided with receptacles into which the blanks are fed, from which they are automatically transferred to the several forming mechanisms and into which they are replaced automatically after each operation.

The several features of novelty will be set forth in the detailed description below, and particularly pointed out in the claims.

Figure 2:
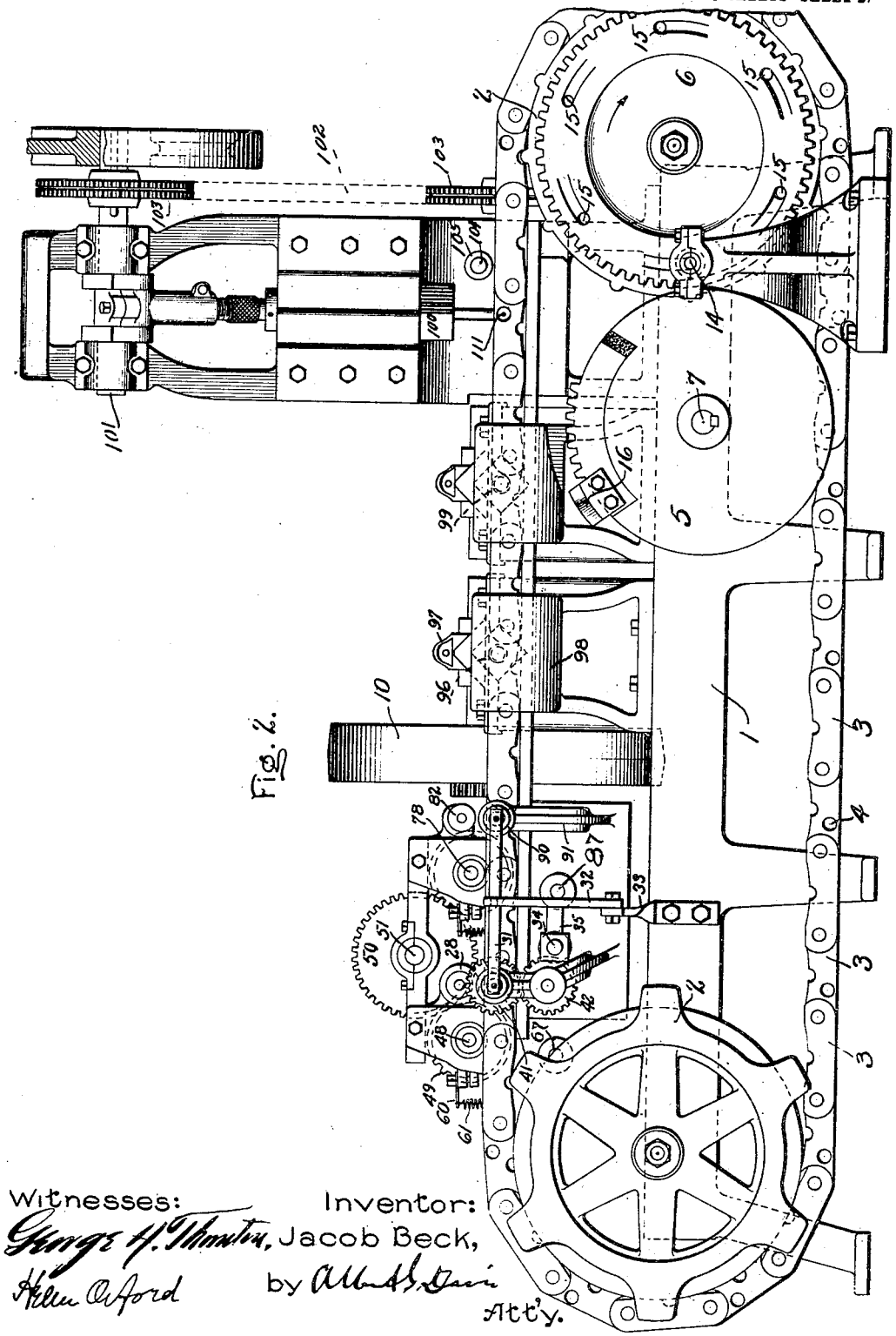
Figure 3:
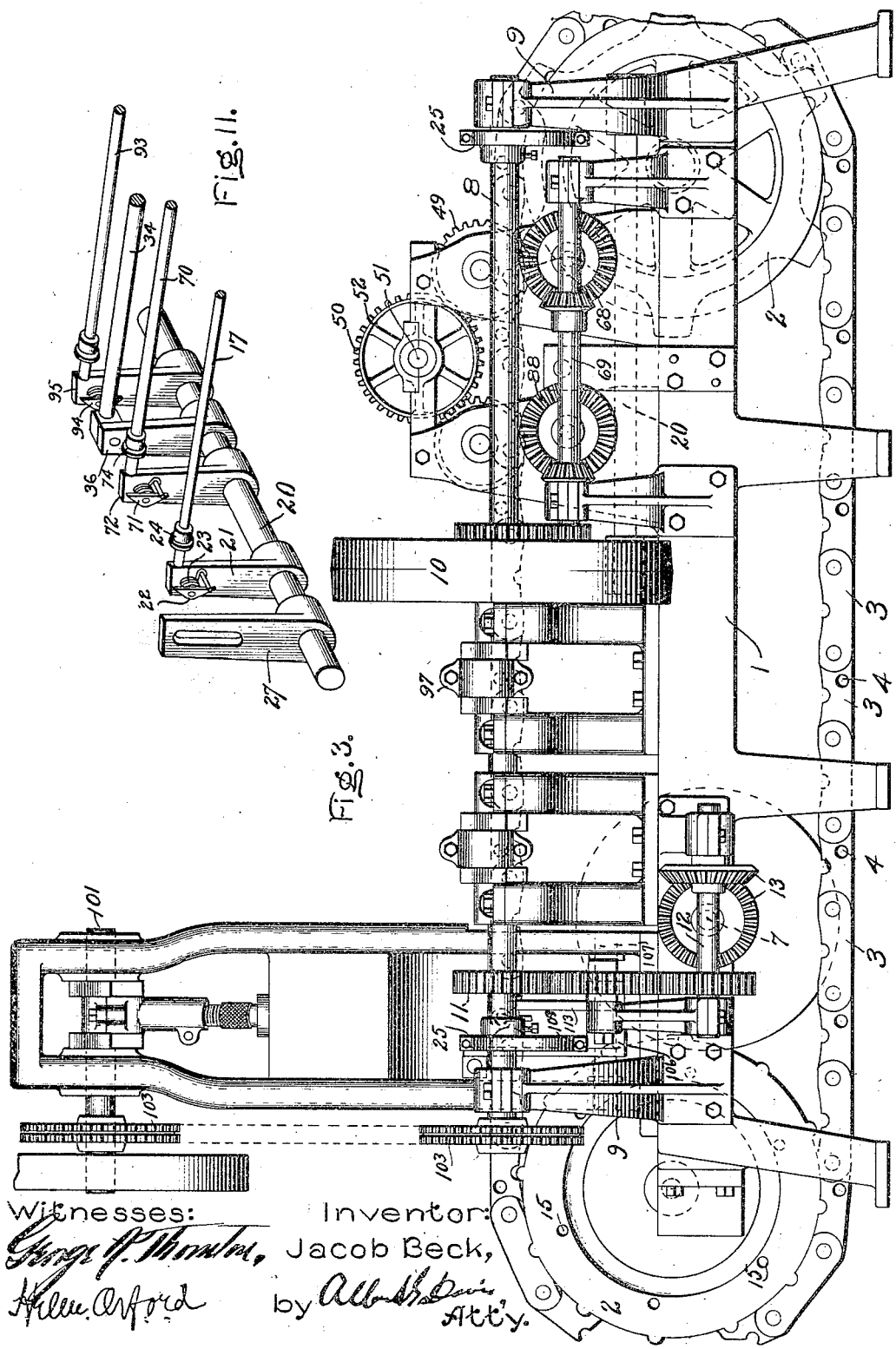
Figure 4:
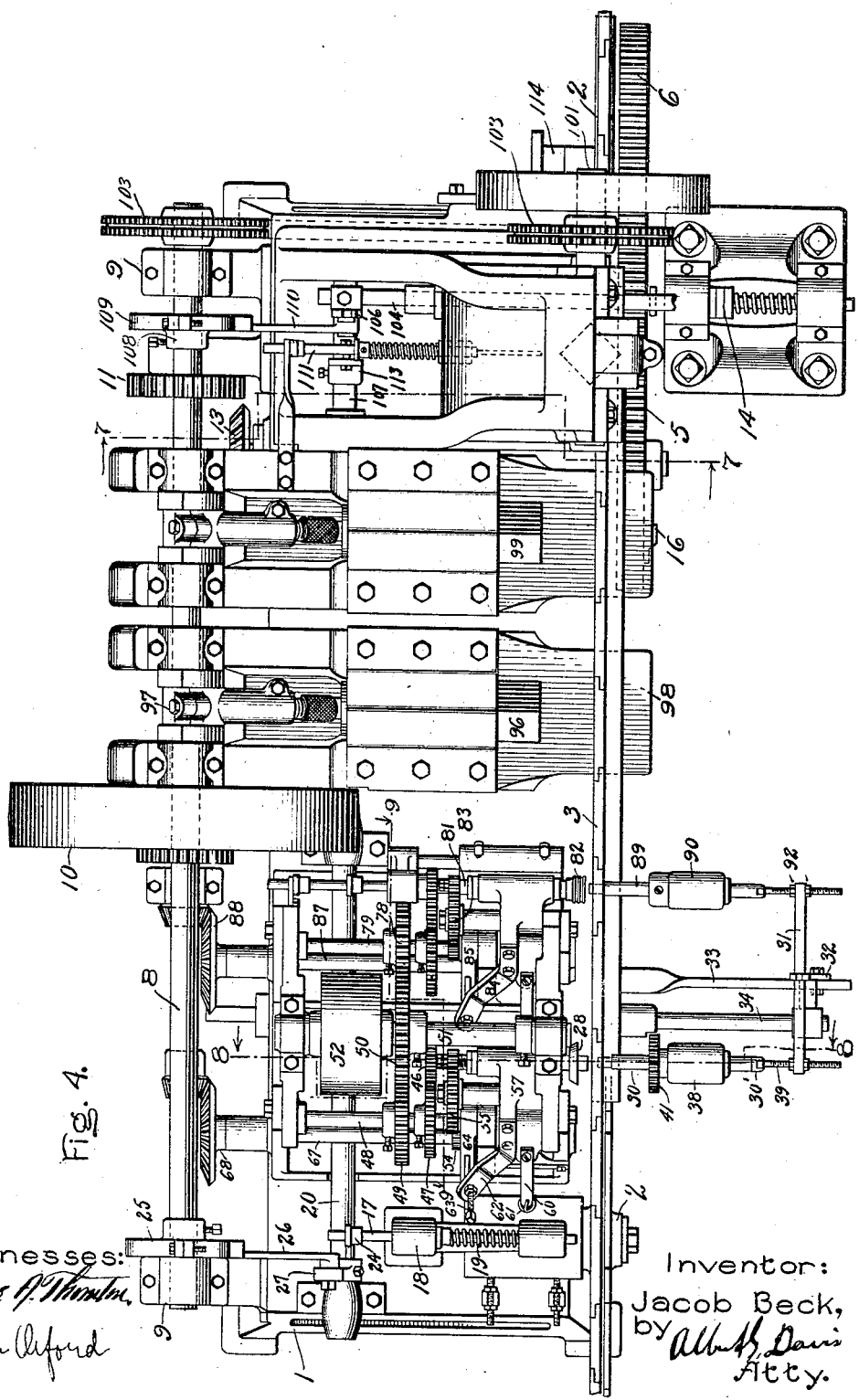
Figure 5:
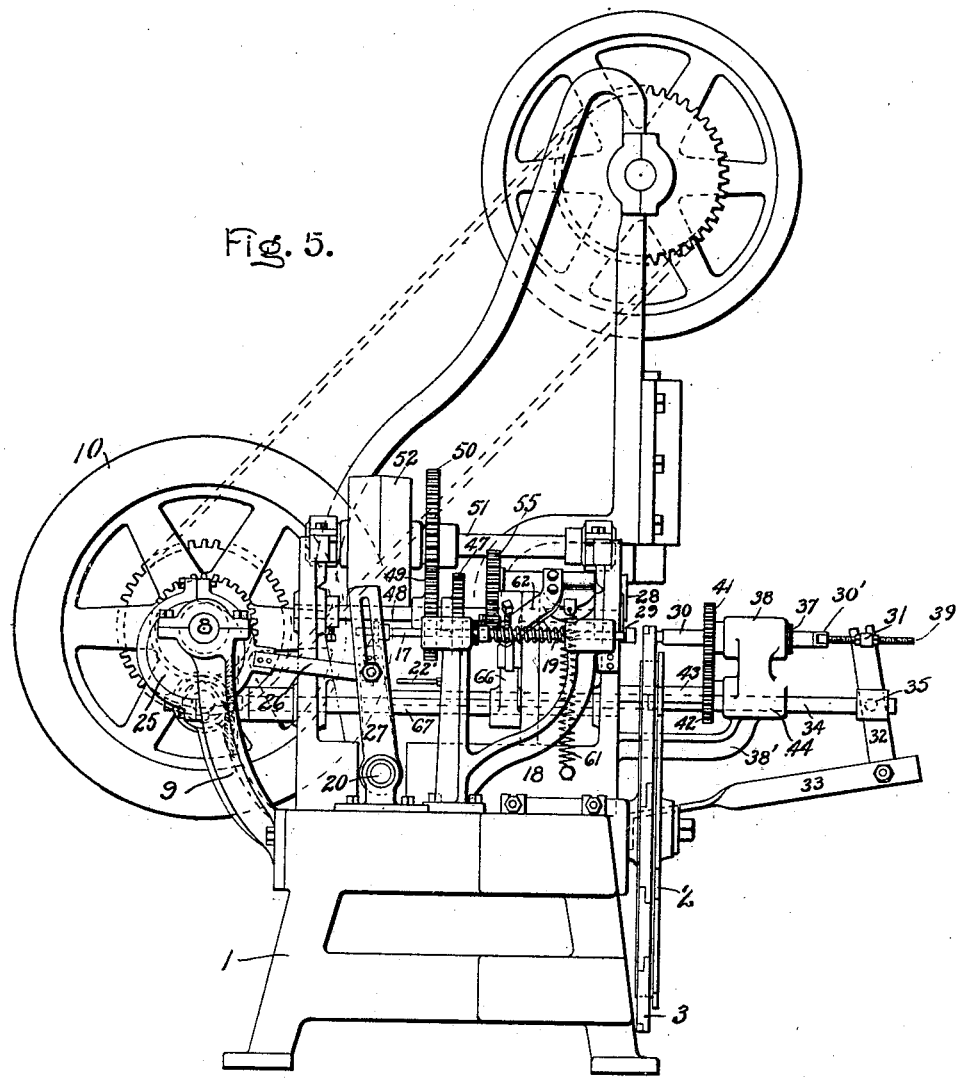
Figure 6:
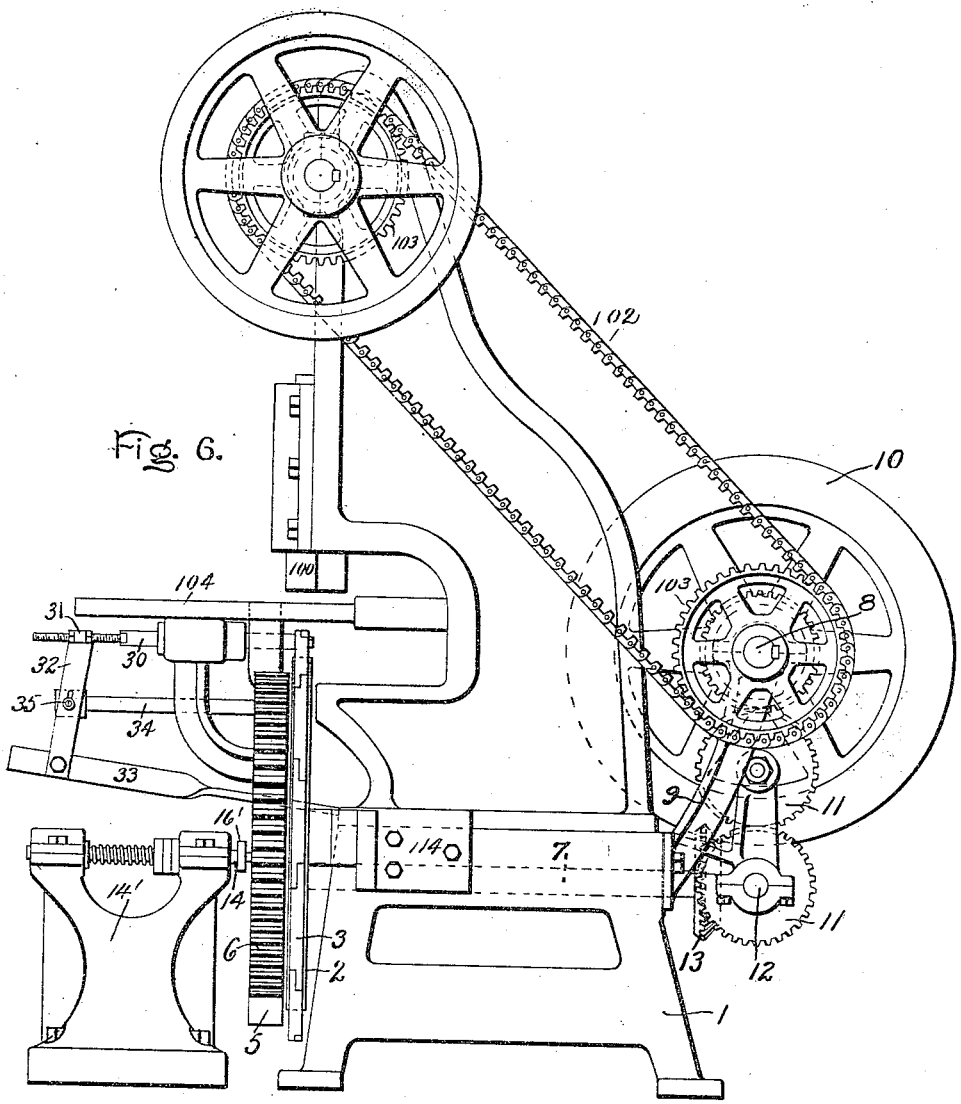
Figure 7:
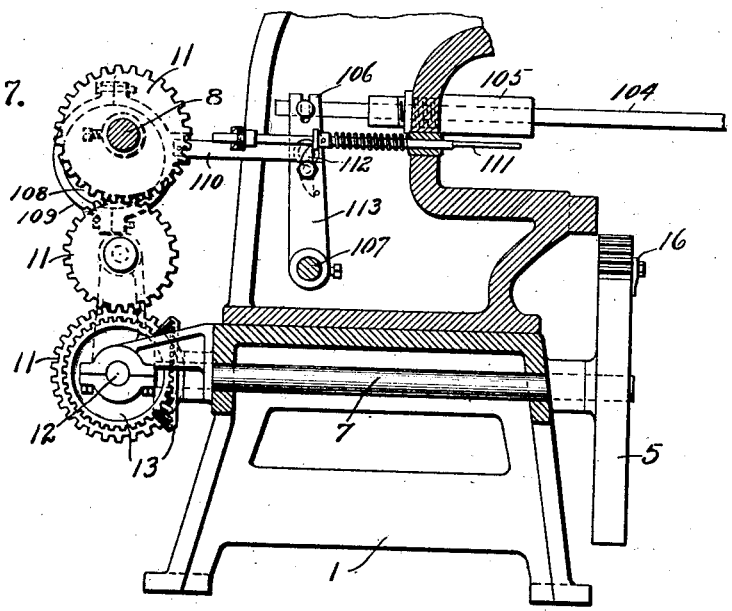
Figure 8:
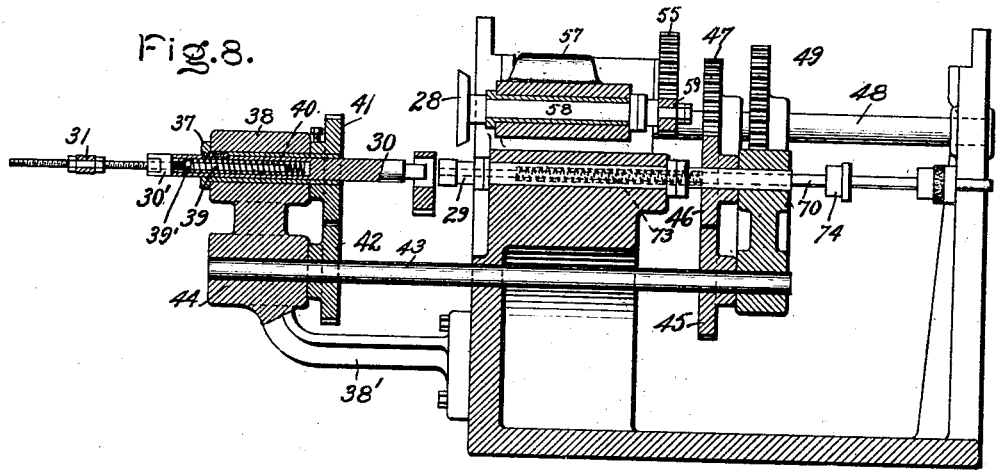

In the accompanying drawings, Figure 1 is a perspective view of the machine. Fig. 2 is a front elevation. Fig. 3 is a rear elevation. Fig. 4 is a top plan view. Fig. 5 is an elevation of the left-hand end in Fig. 2. Fig. 6 is an elevation of the right-hand end. Fig. 7 is a cross-section on the line 7 7, Fig. 4. Fig. 8 is a cross-section on the line 8 8, Fig. 4. Fig. 9 is a cross-section on the line 9 9, Fig. 4. Fig. 10 is a detail. Fig. 11 is a perspective view of the main rock-shaft and some of its coöperating parts. Fig. 12 is a perspective view of the cup-shaped blank shell, and Figs. 13 to 17 illustrate the successive operations which produce the finished shell shown in Fig. 17. Fig. 18 is a perspective view of the means for ejecting the shells from the chain and the female die for cutting the side holes in the shells. Fig. 19 is a part section and part side elevation of the male and female dies for punching the side holes. Figs. 20 and 21 are the male dies for punching and countersinking the holes in the ends of the shells.

The frame 1 of the machine is a stout table-like structure, near each end of which and on its front side is located a large sprocket-wheel 2, suitably mounted for rotation in a plane parallel with the front of the frame. Over these wheels runs an endless-chain carrier composed of links 3, some of which (preferably alternate ones) have recesses or cylindrical holes 4, adapted to receive the shells with slight friction and carry them from one forming mechanism to the next. The chain is driven intermittingly by a mutilated gear 5, which engages at regular intervals with a spur-gear 6, secured to the face of one of the sprocket-wheels. The mutilated gear is keyed on a shaft 7, running across the frame 1 and geared to the main shaft 8, which is located lengthwise of the machine at its rear and is journaled in bearings, preferably in brackets 9, rising from the rear of the frame 1. The main shaft is driven by a belt-pulley 10, and its connection with the transverse shaft 7 is preferably by means of spur-gears 11, a counter-shaft 12, and bevel-gears 13. The carrier-chain is locked after each movement by a spring-pressed bolt 14, longitudinally movable in a bracket 14' toward the face of the gear 6 and engaging with sockets 15 in the spur-gear 6. A cam 16 on the mutilated gear 5 engages a collar 16', fixed to the bolt 14 near its operative end and withdraws the bolt just before the toothed segment of the gear 5 engages the gear 6.

The shells are fed to the carrier in any suitable manner; but I prefer to do it automatically by a reciprocating plunger 17, mounted in a bracket 18 and normally held retracted by a spring 19. To actuate the plunger, there is provided a rock-shaft 20, extending lengthwise of the frame 1 and having a rock-arm 21, carrying a pivoted dog 22, held yieldingly in an upright position by a spring 23.

When the rock-arm is moved forward, the dog strikes a head 24 on the rear end of the plunger 17 and forces the front end of the plunger forward into a recess on the carrier-chain, carrying with it a blank shell. As the plunger reaches its limit of forward movement the dog strikes a fixed stud 22' and is tripped, so that it slips off the head 24. The spring 19 instantly retracts the plunger, and when the rock-arm moves back the dog can yield when it strikes the head 24, and thus slip past it to a position in the rear again. The rock-shaft 20 is oscillated by suitable connections with the main shaft 8, preferably an eccentric 25 on said shaft, whose rod 26 is pivoted to a lever 27 on said rock-shaft. The lever is preferably slotted lengthwise to permit an adjustment of the pivot and the consequent throw of the rock-arm 21.

The first operation to which the blank shell is subjected is that of trimming its edge. This is accomplished by a rotary cutter 28, coöperating with a shoulder on a cylindrical rotary arbor 29, adapted to receive and support the shell, which is forced thereon from the hole in the carrier-chain by means of a reciprocating plunger 30. Movement is imparted to this plunger by a cross-bar 31, carried by a lever 32, fulcrumed on a bracket 33, projecting from the front of the machine. The lever is actuated by a rod 34, pivotally attached to said lever at 35 and running back across the machine to a rock-arm 36 on the rock-shaft 20, to which arm the rod is pivotally attached. The plunger is splined in a tubular shaft 37, journaled in a bearing 38, carried by a bracket 38', fastened to the frame 1. For a portion of its length the plunger is tubular to receive a rod 39, which slides through a longitudinally-perforated plug 30', screwed into the outer end of the plunger. A collar 39' limits the outward movement of said rod, and between said collar and the inner end of the bore in the plunger is confined a helical spring 40. The outer end of the rod 39 is adjustably fastened to the cross-bar 31, whose movement is yieldingly imparted to the plunger through the rod and the spring. A gear 41 on the shaft 37 meshes with a gear 42 on a shaft 43, parallel with the shaft 37 and having an outer bearing 44 in the bracket 38' and extending back into the machine, where it carries a gear 45, meshing with a gear 46 on the arbor 29. This gear 46 also meshes with a gear 47 on a parallel shaft 48, on which is keyed a spur-gear 49, meshing with a driving-gear 50 on a pulley-shaft 51, carrying also a pulley 52 for the driving-belt 53. The shaft 48 is also provided with a pinion 54, which meshes with a gear 55 on a short shaft 56, journaled in a rocker 57, which is sleeved on the shaft 48, so as to be angularly movable thereon. The rocker also carries a short shaft 58, on which is a pinion 59, meshing with the gear 55.

The projecting front end of the shaft 58 carries the rotary cutter 28, and it will be seen that this cutter will be rotated by the pinions 54 and 59 and the intermediate gear 55 irrespective of any angular movement of the rocker on the shaft 48.

Suitable means are provided for actuating the rocker. On the side opposite the cutter is a tail 60, to which is attached a tension-spring 61, tending to withdraw the cutter from the arbor 29. A finger 62 is fastened to the rocker and carries an adjusting-screw 63, bearing upon the back of an arm 64, loosely fulcrumed on the shaft 48 and preferably provided with a roller 65 bearing on the periphery of a cam 66, which is keyed on a shaft 67, driven preferably by the bevel-gears 68 and a counter-shaft 69, geared to the main shaft 8. This cam periodically rocks the cutter down upon the arbor 29 and trims the edge of the cup-shaped blank which the plunger has pushed out of a hole in the carrier-chain and forced upon the arbor. The blank is compelled to rotate with the arbor because it is firmly clamped between the ends of the arbor and the plunger, and both these parts rotate in unison by reason of the gearing which connects them.

When the blank has been properly trimmed it is removed from the arbor by a stripping-rod 70, which is reciprocable in the tubular arbor 29 and is driven forward to force the blank off the arbor and into a hole in the carrier-chain by a dog 71 on a rock-arm 72 on the rock-shaft 20. These parts are the same in construction and operation as the plunger 17, arm 21, and dog 22, hereinbefore described. The stripping-rod 70 is instantly retracted by a spring 73 when the dog 71 slips off the head 74 on said rod.

The next movement of the carrier-chain brings the trimmed blank opposite the thread-forming devices, which comprise a rotating arbor 75, carrying on its projecting forward end the lower screw-threaded roll 76 and driven by a pinion 77, meshing with a gear 78 on a shaft 79, parallel with the shaft 48 and like that geared to the driving-gear 50. On the shaft 79 is sleeved a rocker 80, similar to the rocker 57 and carrying a short shaft 81, provided with the upper screw-threaded roll 82 and geared by the intermediate idler 83 to the shaft 79. The rocker has a finger 84 engaging with an arm 85, which is actuated by a cam 86 on a cam-shaft 87, parallel with the cam-shaft 67 and like the latter driven from the counter-shaft 69 by means of bevel-gears 88.

On the opposite side of the carrier-chain from the lower roll 76 is a plunger 89 slidable in a bearing 90 on a bracket 91 and actuated by the cross-bar 31, to which it is adjustably connected by nuts 92. This plunger feeds the trimmed blank from the carrier-chain on to the lower roll 76, from which it is removed by a stripping-rod 93, driven by a dog 94 on a rock-arm 95 on the rock-shaft 20 in the same way as the stripping-rod 70 is operated. The screw-threaded blank is then brought by the carrier-chain into line with a punch 96, shaped as shown in Fig. 20, working in horizontal guides on the frame of the machine and driven by a crank 97 in the main shaft 8. The anvil 98, which holds the stationary die of the punch, lies close in front of the chain, so that the blank is held in its hole in the chain in exactly the right position to be operated on by the punch and die which cut out the middle portion of the end of the cup-shaped blank and also form two small holes in the flange that remains, as clearly shown in Fig. 15. The chain then feeds the blank along to a position in line with the punch 99, as shown in Fig. 21, which is similar in construction and operation to the other. This punch countersinks the two screw-holes in the flange of the blank, as shown in Fig. 16, the blank still remaining in the hole in the carrier-chain. The next movement of the chain brings the blank to the upright punch 100, actuated by a crank-shaft 101, which is driven from the main shaft 8, preferably by an endless-chain belt 102 and sprocket-wheels 103. The blank is moved out from the carrier-chain and under the punch by a short suitable arm on a reciprocating bar 104, which slides in a bearing 105 and is pivotally connected with a slot in a rock-arm 106 on a short rock-shaft 107, actuated by the main shaft 8, preferably by an eccentric 108 on said main shaft, provided with a strap 109 and rod 110, the latter being pivoted to the rock-arm 106.

The reciprocating bar 104 extends out over the chain 3 and has secured near its end a cross-bar 115, provided with ejector-fingers 116 and 117. The finger 116 is rigidly connected thereto and serves to eject the completed shell from the chain, and finger 117 is longitudinally movable in the bar 115 for a purpose to be presently described. The outer end of finger 117 is bored out for the reception of a spring 118, and the end of a presser-rod 119, carried by an arm 120, fixed to the outer end of bar 104. A crank-arm 121 is secured to the middle of the finger and carries a guide-pin 122, which plays in a hole formed in cross-bar 115, and serves to prevent angular movement of the finger. The operative end of the finger 117 is provided with studs 123, which enter the countersunk holes in the ends of the shells to prevent their angular movement while being forced upon the female die 124.

The female die 124 consists of a cylindrical bar 125, rigidly fixed to a bracket 126, bolted to the frame 1, and has at its operative end a diagonal aperture 127, through which the punched scrap may drop. Surrounding the operative end of the die 124 is a shell steadying and guiding sleeve 128, covered by a cross-plate 129, having guide-rods 130 projecting rearwardly therefrom through the bracket 126 and surrounded by springs 131, which normally hold the sleeve 128 pressed forward. When a shell is presented to the female die 124 by the finger 117, the sleeve 128 engages the upper edge of the shell and travels back with it under the pressure exerted by the finger 117 and prevents the shell from tilting, as it is liable to do when not held at both ends.

The punch 100 carries a toe-piece 136, which extends below the end of the punch and between the end of the die 124 and the end of the finger 117, the latter yielding under the action of its spring 118, and operates to bend in the bottom edge of the portion to be removed from the shell by the punch 100. The shell is stripped from the die 124 by a stripping-rod 111, actuated by a dog 112 on a rock-arm 113 on the rock-shaft 107 and engaging at its forward end with a head 132, in which are set two small rods 133, which extend longitudinally through the female die 124 so as to engage the inner ends of the shells upon the completion of the punching operation. The head 132 is normally pressed rearwardly by a spring 134 engaging therewith and with a socket 135 in the rear end of the die 124. As the shell is finally forced from the chain by finger 116 it falls into a trough 114, by which it is deflected to suitable receptacles.

The operation of the machine may be briefly recapitulated as follows: The cup-shaped blanks of sheet metal are fed by the plunger 17 into the holes in the carrier-chain 3, by which they are moved intermittingly from one to another of the operating mechanisms. Arriving first opposite the trimming device the blank is pushed out of the carrier by the plunger 30 onto the arbor 29, where it is held between said arbor and plunger while it is rotated under the cutting-wheel, which is rocked down upon it. The trimmed blank is then forced back into its hole in the carrier by the stripping-rod 70. The next step of the carrier-chain brings the blank to the screw-threading rolls, between which it is forced by the plunger 89 and from which it is removed to the carrier by the stripping-rod 93. The carrier then moves the blank to the punch 96, by which three holes are punched in the end of the blank while it is held in the carrier-chain. A further movement brings it in line with the punch 99, which countersinks the two screw-holes. The final operation is performed by the punch 100, which cuts out a portion of the side of the blank after it has been pushed out of the carrier-chain by the bar 104. The finished product is stripped from the punch by the stripping-rod 111 and returned to the chain and carried opposite ejector-finger 116, where it is forced out and falls down the spout 114 to a suitable receptacle.

While the machine is especially designed for making shells for electric-lamp sockets, yet it is manifestly capable of operating upon cup-shaped sheet-metal blanks for many other articles.

What I claim as new, and desire to secure by Letters Patent of the United States, is—

1. In a machine for making screw-shells, the combination of means for cutting the shells to desired lengths, means for screw-threading the side walls of the shells, and means for automatically positioning the shells with respect to said cutting and screw-threading means.

2. In a machine for making screw-shells, the combination of means for cutting the shells to desired lengths, means for screw-threading the side walls of the shells, means for punching holes in the shell ends, and means for automatically positioning the shells with respect to said operating means.

3. In a machine for making screw-shells, the combination of means for screw-threading the side walls of the shells, means for punching holes in the ends and side walls, and means for automatically positioning the shells with respect to said operating means.

4. In a machine for making screw-shells, the combination of means for cutting the shells to desired lengths, means for screw-threading the side walls, means for punching and countersinking holes in the end walls, means for removing portions of the side walls, and means for automatically positioning the shells with respect to said operating means.

5. In a machine for operating on cup-shaped blanks, an endless carrier for the blanks consisting of a chain having holes in its links to receive said blanks.

6. In a machine for operating on cup-shaped blanks, an endless carrier consisting of a chain having in some of its links holes extending transversely therethrough, of a size to receive and hold said blanks.

7. In a machine for operating on cup-shaped blanks, the combination with an endless carrier, of sprocket-wheels for supporting the same, a lock for holding said carrier stationary, means for intermittently actuating the carrier, and an unlocking device controlled by said means.

8. In a machine for operating on cup-shaped blanks, the combination with an endless carrier, of sprocket-wheels for supporting the same, a gear-wheel on the shaft of one sprocket, a lock for holding said gear-wheel stationary, a mutilated gear for intermittingly actuating said gear-wheel, and an unlocking device carried by said mutilated gear.

9. In a machine for operating on cup-shaped blanks, the combination with an endless carrier, of a gear-wheel for actuating the same provided with sockets, a spring-bolt arranged to engage therewith, a mutilated gear for driving said gear-wheel intermittingly, and a cam on said mutilated gear for withdrawing the bolt when the gear-wheel is to be driven.

10. In a machine for operating on cup-shaped blanks, the combination with a carrier provided with receptacles for said blanks, of a spring-retracted plunger working transverse to the path of said receptacles, and a rock-arm moving in the plane of said plunger and adapted to engage therewith during a portion of its movement.

11. In a machine for operating on cup-shaped blanks, the combination with a carrier provided with receptacles for said blanks, of a spring-retracted plunger, a rock-arm moving in the plane of the same, and a finger pivoted on the rock-arm to engage with said plunger.

12. In a machine for operating on cup-shaped blanks, the combination with a carrier provided with receptacles for said blanks, of a spring-retracted plunger, a rock-arm moving in the plane of the same, a finger pivoted on the rock-arm to engage with said plunger, and means for disengaging said finger at a predetermined point in its movement.

13. In a machine for operating on cup-shaped blanks, the combination with a carrier provided with receptacles for said blanks, of a spring-retracted plunger, a rock-arm moving in the plane of the same, a finger pivoted on the rock-arm to engage with said plunger, operative connections between a power-driven shaft of the machine and the rock-arm, and a fixed stop to trip said finger at a predetermined point.

14. In a machine for operating on cup-shaped blanks, the combination with a carrier having receptacles for said blanks, of a rotatable arbor, a rotary cutter coöperating therewith, and rotatable means for transferring a blank from a receptacle to the arbor and coöperating therewith to rotate the blank.

15. In a machine for operating on cup-shaped blanks, the conbination with a carrier having receptacles for said blanks, of a rotatable arbor, a rotary cutter coöperating therewith, and rotatable means for transferring a blank from a receptacle to the arbor and for holding it thereon and rotating therewith while the cutter is operating.

16. In a machine for operating on cup-shaped blanks, the combination with a carrier having receptacles for said blanks, of a rotatable arbor, a rotary cutter coöperating therewith, rotatable means for transferring a blank from a receptacle to the arbor and coöperating therewith to rotate the blank, and means for returning the blank to the receptacle after the cutter has operated on it.

17. In a machine for operating on cup-shaped blanks, the combination with a power-driven shaft, of an arbor geared thereto, a rocking frame mounted on said shaft, an arbor journaled in said frame and geared to said shaft, a cam for rocking said frame to cause said arbors to approach each other, and a spring for separating said arbors after the cam has acted.

18. In a machine for operating on cup-shaped blanks, the combination with a power-driven shaft, of a tubular arbor geared thereto, a rocking frame carrying an arbor to coöperate with the tubular arbor, means for rocking said frame, means for supplying said tubular arbor with a cup-shaped blank, and an ejector-rod passing through said arbor.

19. In a machine for operating on cup-shaped blanks, the combination with a carrier having receptacles for said blanks, of a tubular arbor, a rotating and reciprocating plunger for transferring a blank from the carrier to the arbor and coöperating therewith to rotate the blank, and an ejector-rod in said arbor.

20. In a machine for operating on cup-shaped blanks, the combination with a carrier having receptacles for said blanks, of a tubular arbor, a rocking frame carrying an arbor to coöperate with the tubular arbor, means for rotating the arbors, means for rocking the frame, a reciprocating and rotating plunger for transferring a blank from the carrier to the tubular arbor, and an ejector-rod reciprocable in said arbor.

21. A machine for operating on cup-shaped blanks, comprising an endless carrier, a reciprocating plunger for feeding the blanks to said carrier, a rotating arbor, a trimming-cutter coöperating therewith, a rotatable plunger for transferring a blank from the carrier to said arbor, an ejector-rod for returning the trimmed blank to the carrier, a rotating screw-threaded arbor, a screw-threading roll coöperating therewith, a plunger for transferring a blank from the carrier to said arbor, and an ejector-rod for returning the threaded blank to the carrier.

22. A machine for operating on cup-shaped blanks, comprising an endless carrier, a reciprocating plunger for feeding the blanks to said carrier, a rotating arbor, a trimming-cutter coöperating therewith, a rotatable plunger for transferring a blank from the carrier to said arbor, an ejector-rod for returning the trimmed blank to the carrier, a rotating screw-threaded arbor, a screw-threading roll coöperating therewith, a plunger for transferring a blank from the carrier to said arbor, an ejector-rod for returning the threaded blank to the carrier, means for simultaneously operating said plungers, and means for simultaneously operating said ejector-rods.

In witness whereof I have hereunto set my hand this 18th day of March, 1904.

JACOB BECK.

Witnesses:
EDWARD WILLIAMS, Jr.,
BENJAMIN B. HULL.